Figure 1:
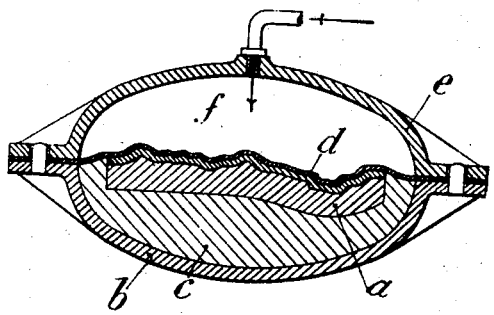

E. LANHOFFER.
APPARATUS FOR MOLDING OBJECTS BY PRESSURE.
APPLICATION FILED MAR. 27, 1913.

1,209,308.

Patented Dec. 19, 1916.

Witnesses:-
Hyperion Barry.
F. George Barry.

Inventor:-
Edmund Lanhoffer
by his attorneys
Brown & Seward

UNITED STATES PATENT OFFICE.

EDMOND LANHOFFER, OF POISSY, FRANCE.

APPARATUS FOR MOLDING OBJECTS BY PRESSURE.

1,209,308.  Specification of Letters Patent.  Patented Dec. 19, 1916.

Application filed March 27, 1913. Serial No. 757,173.

*To all whom it may concern:*

Be it known that I, EDMOND LANHOFFER, citizen of the Republic of France, and resident of No. 2 Boulevard de Maisons, Poissy, in the Department of Seine-et-Oise, in the said Republic, engineer, have invented a new and useful Apparatus for Molding Objects by Pressure, of which the following is a specification.

This invention relates to a method of and apparatus for molding objects by pressure, especially such objects as are produced from agglomerated fibrous materials.

Every material capable of being molded and necessitating a more or less forcible compression for the exact reproduction of the pattern generally requires a die or platen for distributing the pressure over the whole surface of the mold as uniformly as possible. Now the production of a die capable of taking into exact account the displacements of material necessary to reproduce the relief is very costly and almost impossible of attainment where somewhat complicated molds are concerned.

The materials composed of fibers and hydraulic agglomerants, particularly when the agglomerant is cement, have the objectionable quality of giving up, under a low pressure, the excess of water which they contain and which makes them plastic. As a result the displacements of the material which are necessary for the reproduction of the pattern, are only effected with much difficulty, the pattern is not accurately reproduced and the plate or other object obtained shows excessive inequalities of compression, it becomes very hard and sharp at those places which have been much compressed and remains spongy and not clearly formed at the places where owing to a lack of material, the compression and the charge in the mold have been insufficient.

A method of manufacturing plates of cement and asbestos is already in existence, which consists in pressing the material in question between two plane surfaces in a hydraulic press, but experience has shown that even in this case where the displacements of the material meet with the minimum of difficulty, it is impossible to obtain a uniform compression of the material over all parts of the plate or object. If it be desired to produce plates in more or less accentuated relief instead of plane surfaces it is immaterial how thick the plate may be, but on the other hand, uniform compression is absolutely necessary in order that the product may have everywhere the same hardness and the same clearness of reproduction of the pattern. According to the present invention, these difficulties have been overcome by replacing the rigid die or platen generally employed for the pressure, by an elastic die, which, by its own extension and the movements which it produces in the material, assists the displacements of the latter and insures an approximately uniform distribution of pressure.

Figure 2:
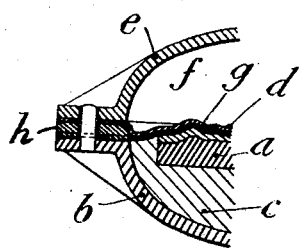
Figure 3:
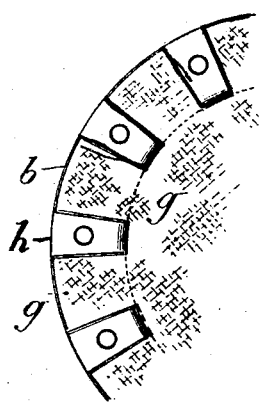

In order to enable this invention to be readily understood reference is made to the accompanying drawing which illustrates by way of example two constructions of apparatus adapted for carrying out the invention in which:

Figure 1 is a vertical section of a fluid pressure molding device fitted with a rubber diaphragm. Fig. 2 is a similar view of a modification in which a felt sheet is held between the rubber diaphragm and the mold, and Fig. 3 is a plan of a fragment of the mold container.

In a general way, the method consists in arranging the mold $a$ in a container $b$ of cast iron or steel. The space in the container is filled with an incompressible mass $c$ forming a good support for the mold. The fibrous material is then spread over the mold in a layer which is as uniformly thick as possible and the whole is covered with a sheet of rubber or other analogous material $d$, which is held in the joint between the container $b$ and its cover $e$. The cover being fixed, water under pressure is admitted to the space $f$ between the cover and the sheet of rubber in order to force the sheet and with it the material to be compressed into all parts of the mold. The material, however much it may be squeezed before being spread over the mold, still contains some water and air which would prevent it from being absolutely compressed and would leave bubbles and porous parts in many places. For the purpose of allowing of the expulsion of the water and air, a felted material $g$ capable of assuming the form of the mold without being torn, by preference a felted knitted fabric, is placed between the material and the sheet of rubber as shown in Fig. 2. The edge portions of this sheet of felt are clamped between the lower surface of small blocks $h$ and the flange of the container *b* and as the edge of the material *g* is exposed to the atmosphere it will be possible for water and air to exude thereat as the edge portions aforesaid are not tightly clamped except at those places where the blocks *h* are situated as shown in Fig. 3. The rubber sheet or diaphragm *d* is clamped between the upper surface of the blocks *h* and the lower surface of the flange of the cover *e*.

The spreading of the material on the mold is a delicate operation and should be carried out with great care in order to avoid having an excess of material in the hollows of the mold and insufficient material on the projecting parts.

For making plates having parts only slightly in relief it is possible to simplify the operation by applying the material to the mold in the form of sheets made as soft as possible in known manner. When these sheets are very soft and the parts in relief are not too prominent, the displacement of the material produced by the movement communicated by the rubber is sufficient to avoid tearing or to close any rents which may be made.

What I claim is:—

1. A mold press comprising in combination a matrix container, a matrix therein, a sheet of fabric covering said matrix, clamping means adapted for securing said sheet to said container at intervals only along the edges of said sheet, a flexible elastic membrane covering said sheet, a cover for said container and a fluid pressure connection on said cover.

2. A mold press comprising in combination a matrix container, a matrix therein, a cover adapted to be jointed with said container, a sheet of fabric covering said matrix and having its edges entering the joint between said container and said cover, a flexible elastic membrane or diaphragm covering said sheet and having its edges likewise entering said joint, means in said joint adapted to engage the edge portions of said fabric at intervals only, fastening means adapted to secure said cover to said container, and a fluid pressure connection on said cover.

3. A mold press comprising in combination a matrix container, a matrix therein, a flange on the peripheral edge of said container, a sheet of fabric adapted to cover said matrix and to extend with its edge portion over said flange, a number of blocks corresponding to said flange and adapted to be placed on the portion of said fabric covering said flange, a flexible elastic membrane or diaphragm extending with its edge portions over said blocks, a cover for said container, a flange on the periphery of said cover corresponding with the flange on said container, means adapted to fasten the two flanges together with said blocks, sheet of fabric and membrane clamped between and a fluid pressure connection on said cover.

In testimony, that I claim the foregoing as my invention, I have signed my name in presence of two witnesses, this twelfth day of March, 1913.

EDMOND LANHOFFER.

Witnesses:
 LUCIEN MEMMINGER,
 ALCIDE FABRE.